(12) United States Patent
Faisman et al.

(10) Patent No.: US 8,583,734 B2
(45) Date of Patent: Nov. 12, 2013

(54) HETEROGENEOUS EVOLUTIONARY SELF-FORMATTING INTERNET PROTOCOLS

(75) Inventors: Alexander Faisman, Corton-on-Hudson, NY (US); Genady Grabarnik, Scarsdale, NY (US); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 12/193,395

(22) Filed: Aug. 18, 2008

(65) Prior Publication Data

US 2008/0313280 A1      Dec. 18, 2008

Related U.S. Application Data

(63) Continuation of application No. 11/492,229, filed on Jul. 25, 2006.

(51) Int. Cl.
*G06F 15/16*      (2006.01)

(52) U.S. Cl.
USPC ........................................ 709/204

(58) Field of Classification Search
USPC ........................................ 709/204
See application file for complete search history.

(56) References Cited

U.S. PATENT DOCUMENTS

| | | | |
|---|---|---|---|
| 6,829,569 B1 | 12/2004 | Drucker et al. | |
| 2004/0083454 A1 | 4/2004 | Bigus et al. | |
| 2004/0250258 A1* | 12/2004 | Raghuvir et al. | 719/315 |
| 2005/0052999 A1* | 3/2005 | Oliver et al. | 370/231 |
| 2007/0050764 A1* | 3/2007 | Traut | 718/1 |

* cited by examiner

*Primary Examiner* — Hussein Elchanti
*Assistant Examiner* — Maceeh Anwari
(74) *Attorney, Agent, or Firm* — Scully, Scott, Murphy & Presser, P.C.; Daniel P. Morris, Esq.

(57) ABSTRACT

A system, method and computer program product for virtual communities that enables the establishment of rules created by members of the society in accordance with the existing rule creation restrictions and, that provides a mechanism for validating and accepting of the rules established inside the society. The system, method and computer program product further provides a mechanism that enables the establishment of rules created by members of the virtual society themselves, that allows for the self-evolution of the virtual societies.

34 Claims, 8 Drawing Sheets

HETEROGENEOUS EVOLUTIONARY SELF-FORMATTING INTERNET PROTOCOLS

CROSS REFERENCE TO RELATED APPLICATION

The present application is a continuation application of U.S. Ser. No. 11/492,229 filed Jul. 25, 2006, the entire contents of which are incorporated herein by reference.

FIELD OF THE INVENTION

The present invention relates generally to computer-based communications, systems and environments thereof and more particularly, to a novel system and method for providing heterogeneous evolutionary self-formatting Internet protocols.

DESCRIPTION OF THE PRIOR ART

While connecting to Internet users and organizations together in a generic, multimodal and open standards-based way, it is found that the Internet, by and of itself, does not provide means to connect its users in a most efficient way. That is, the Internet is neutral to the way users communicate or act (except providing basic ways to provide protocol for communication), it does not protect users from potential misusages of other users. Usually all regulations are external to the Internet, regulation rules belong to the country, region, forum or chat room a specific person operates in.

U.S. Pat. No. 6,829,569 is directed to a system and method that covers social dilemma virtual world environment (VWE) software facilitates creation and usage of social dilemma tests or exercises for measuring and analyzing online interactive societies. The teachings of U.S. Pat. No. 6,829,569 are directed to only the collection of data and the measurement of interaction between members of the virtual world environment.

In a further prior art example, America On-line® the software and service provider that provides interactive services, Web brands, Internet technologies and e-commerce services, provides a mechanism for establishing community standards. Particularly, the AOL® web-site provides a community infrastructure through message boards and chat rooms by providing a large gathering place enabling users to share interests and forge friendships. Appurtenant to the AOL® web-site's community infrastructure enablng interaction among users, there are established community standards and guidelines aim to make it easier for users to take part and help provide a better experience for all participants. For example, AOL® offers supervised community areas for kids and teens including a mechanism providing parents with the ability to establish Parental Controls and enable customization of their family's online experience. Further examples, in the context of the AOL® web-site providing a chat room and message boards infrastructure, rules and standards are established that discourage usage of extreme language, explicit sexual references or talk that incites hatred anywhere on the service. Moreover, AOL® the web-site discourages users discussing any money-making schemes or advertisements in the chat rooms or on the message boards, and discourages the users not to use the message boards or chat rooms as a personals service, i.e., users are restrained from posting personal or viewing personal ads. Moreover, the chat rooms and message boards in the AOL® web-site prevents distribution of any content (photos, files, etc.) that is sexually explicit or incites hatred against race, culture, religion or sexuality. Other rules, or standards include: the discouragement of impersonating people, whether it is AOL® staff, volunteers or other members; and preventing users who try to obtain someone else's account information, passwords, phone number or address; the maintenance of friendly chat rooms by moderating language used; refraining from harassment or threatening of other members; refraining from disrupting a chat room with scrolling or continuous sounds. AOL® further has a zero tolerance policy towards illegal activities taking place on the service and cooperates with law enforcement as well as take action against a user's account.

Thus it is the case that just as there are unspoken rules that govern how to behave in society, i.e., real-life social gatherings, there are codes of behavior on the Internet (called "etiquette") that are equally important and users must become familiar with these rules of social engagement before becoming involved in AOL®'s community. Through a reporting mechanism provided via AOL®'s community infrastructure, all AOL® members can report anyone who violates the Conditions of Service at AOL®.

The second prior art example thus indicates the establishment of rules to the members of societies by external means.

It would be highly desirable to provide a system and method for virtual communities that enables the establishment of rules created by members of the community ("society") in accordance with the existing rule creation restrictions and, that provides a mechanism for validating and accepting of the rules established inside the society.

It would further be highly desirable to provide a mechanism that enables the establishment of rules created by members of the virtual communities or society themselves that allows for the self-evolution of the virtual societies.

SUMMARY OF THE INVENTION

The present invention is directed to a system, method and computer program product for virtual communities that enables the establishment of rules created by members of the society in accordance with the existing rule creation restrictions and, that provides a mechanism for validating and accepting of the rules established inside the society. The system, method and computer program product further provides a mechanism that enables the establishment of rules created by members of the virtual society themselves, that allows for the self-evolution of the virtual societies.

Thus, according to the present invention, there is provided a method of providing heterogeneous evolutionary self-formatting Internet protocols, based on multiple communication channels such as speech, VoIP, WebCam or regular text-based communication. The members using heterogeneous evolutionary self-formatting Internet protocols will be protected, providing they are not impinging rights of other members. The Internet-like system plays a part in maintaining a proper rules-based system to the benefit of its members. The system of rules for heterogeneous evolutionary self-formatting Internet protocols behaves and corresponds to the set of software/hardware configurations. The system provides hypervisor ability with necessary restriction to follow rules formulated for the specific heterogeneous evolutionary self-formatting Internet protocol. Such protocols are built based on different system rules. Example for such rules could be based on the rules regulating democratic society, for example, as opposed to the rules regulating the totalitarian regime.

Thus, according to the invention, there is provided an open, modality neutral system to connect humans and computers into manageable virtual societies. The system allows overcoming current flaws in the Internet design and suggests the next social-evolutionary step for the existing Internet. That is, its contents change for its own evolution by changing the managing rules which may be created, validated and enforced within the virtual societies.

Generally, the invention provides a system, method and computer program product for managing a virtual society comprising an on-line community of peers interacting via computer systems through the Internet, the method comprising:

providing, by members of the on-line community, a rule system comprising rules for governing actions that may be performed by members of the on-line community;

initiating, by the members of a society, an action request comprising an interaction with another member of the virtual society via a communication channel; and, enforcing rules that determine compliance of a requested action with one or more the rules that govern whether a requested action is to be performed; and one of, rejecting the action if not in compliance with the rule or enabling performance of the action if the requested action is in compliance with the rules, wherein said on-line community of peers is self-evolving by enabling members to change rules for said on-line community's own evolution.

Further to the method, the social behavior of members of the virtual society is supported in accordance with needs of the virtual society.

According to a further aspect of the invention, there is provided a self-evolving system for managing a virtual society comprising an on-line community of peers interacting via computer systems through the Internet, the system comprising:

means for generating a rule system comprising rules for governing actions that may be performed by members of the on-line community;

means for initiating, by the members of a society, an action request comprising an interaction with another member of the virtual society via a communication channel; and, means for enforcing rules that determine compliance of a requested action with one or more the rules that govern whether a requested action is to be performed, wherein an action request is rejected if not in compliance with the rule or, the action is performed if the requested action is in compliance with the rules, wherein social behavior of members of the virtual society is supported in accordance with needs of the virtual society.

Advantageously, the system of the present invention is self-evolving; it is built as a projection of the society (e.g., human society) having members that are united in groups with groups creating rules (laws of the society) with rules adapted to evolve by members. The system additionally implements a mechanism for enforcing the laws.

BRIEF DESCRIPTION OF THE DRAWINGS

The objects, features and advantages of the present invention will become apparent to one skilled in the art, in view of the following detailed description taken in combination with the attached drawings, in which.

DESCRIPTION OF THE PREFERRED EMBODIMENTS

The present invention is directed to a system, method and computer program product for virtual communities that enables the establishment of rules created by members of the society in accordance with the existing rule creation restrictions and, that provides a mechanism for validating and accepting of the rules established inside the society. The system, method and computer program product further provides a mechanism that enables the establishment of rules created by members of the virtual society themselves that allows for the self-evolution of the virtual societies.

Figure 1:
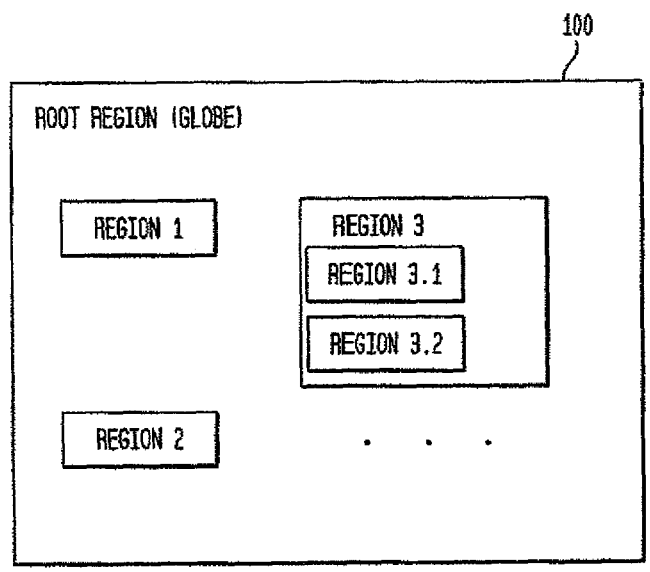
FIG. 1 conceptually depicts an example virtual society structure for which the present invention is implemented.

As will be referred to herein, the following terms are defined:

1. Virtual society: is a term describing various forms of computer-mediated communication, particularly long-term, among large groups through the mediation of computer networks. An example virtual society structure is shown in FIG. 1, that depicts a root region (a globe) 100 comprising multiple societies, e.g., regions, depicted as regions 1, region 2 and region 3, with region 3, for example, broken into farther sub-regions, region 3.1 and 3.2. The regions partitioning defines domains on which corresponded rule systems applies as will be described in greater detail hereinbelow.

2. Self-evolving: means that the society evolves without external supervision/help.

3. Hierarchical: means that groups in the society may include other groups/members.

In accordance with the invention, there are several requirements for the rule system: 1) it must be open to any member of the society (open or democracy like approach) or, to selected group of members of the society (e.g., an Intranet-like approach); and 2) they must be changeable by a predefined body in the society. The body can represent the whole society ("democracy") or some selected group of users (e.g., a corporation, Intranet).

Figure 2:
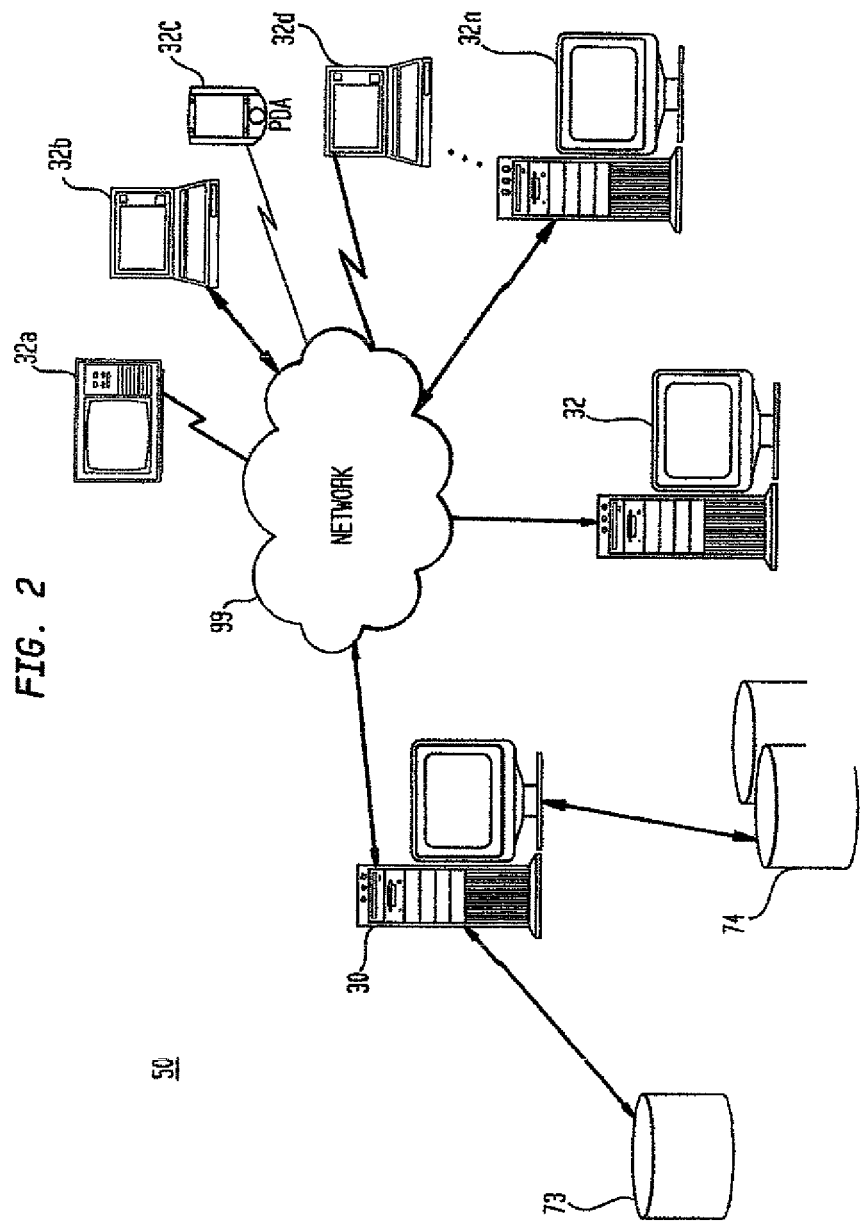
FIG. 2 depicts an exemplary system 50 in which the present invention may be implemented.

FIG. 2 shows the design and architecture of an adaptive (self-formatting) Internet protocols infrastructure 50 in which the methodology for self-formatting Internet protocols of the present invention may be implemented. The system 50 may comprise one or more server devices 30 and one or more connected computing devices 32a, . . . , 32n connected thereto via a wired or wireless network connection that implement client-side Web browsers for interacting with the server. Each computer device 32a, . . . , 32n generally implements a processor device (e.g., a CPU) executing an Operating System (O/S) natively on the computer hardware that is adapted for executing basic computer system functions, and controlling execution of one or more processes and applications. For instance, authorized users may access the Internet via a variety of devices 32a, ..., 32n such as personal computer/computing device, handheld devices (personal digital assistant), laptop or like mobile computing devices, mobile phones or handsets, that implement an operating system such as Windows, Macintosh, UNIX, Linux or other operating system equipped with a Web browser application. The computing devices 32a, ..., 32n may further implement: computer readable media, including a variety of types of volatile and non-volatile media, each of which can be removable or non-removable. For example, a system memory is provided that includes computer readable media in the form of volatile memory, such as random access memory (RAM), and non-volatile memory, such as read only memory (ROM). The ROM may include an input/output system (BIOS) that contains the basic routines that help to transfer information between elements within computer device 32, such as during start-up. Additionally, non-volatile memory may comprise non-volatile "flash" memory or EEPROM memory. The RAM component typically contains data and/or program modules in a form that can be quickly accessed by the CPU. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk-drive, and optical disk drive would be connected to a system bus by one or more data media interfaces (not shown). Alternatively, the hard disk drive, magnetic disk drive, and optical disk drive can be connected to the system bus by a SCSI interface (not shown), or other coupling mechanism. Although not shown, the computer 32 can include other types of computer readable media providing non-volatile storage for storing computer readable instructions, data structures, program modules, and other data for use by computer 32. For instance, the readable media can store the operating system (O/S), and one or more application programs, such as a program for maintaining the rule-based efficiency in the virtual society described herein in greater detail, and/or other program modules and program data for performing the Internet protocol self-formatting methodology conducted in accordance with the invention.

The system infrastructure 50 is adapted to operate as a networked environment using logical connections to a computer device, i.e., server device 30, which may comprise an application server, database server or the like, or may comprise a cluster of servers, accessible by a connected device 32 via a public or private network, represented as network 99, which may comprise a local area network (LAN), or a wide area network (WAN), a corporate intranet, or the Internet. When implemented in a LAN networking environment, the computer device 32 connects to the local network via a network interface card or adapter (not shown) that supports a wireless or wired network communication protocol, transport, and data link layer protocol, e.g., Ethernet, etc. When implemented in a WAN networking environment, the computer device 32 connects to the WAN via a high speed cable/dsl modem, network connection, telephone connection, fiber optic connection, or some other connection means (not shown). Regardless of which networked environment is implemented, the server device 30 receives user queries and, in response, executes one or more applications and database software components for maintaining the rule-based efficiency in the virtual society according to the invention. It is understood that a web-server, database server or cluster of servers may embody a web-site, such as may be hosted by an I.S.P. (Internet Service Provider) or like hosting enterprise, and includes network router and firewall components (not shown), that would enable the self-formatting functions of the invention securely over the Internet. It is thus understood that the software embodying the computer-implemented functions of the invention can be executed on one computer (e.g., in a star-based topology) or can be copied or distributed across several computers in the system 50, and can even be organized as a peer-to-peer computer network.

Regardless of the networked environment employed, it is understood that the server device 30 (whether embodied as part of a web-site, or not) includes those hardware components, software processes and interface connections enabling user access via a wired or wireless network, e.g., through an interface such as a web-browser, as described herein. Particularly, users implementing computer based accessing devices 32a, ..., 32n of the system 50 are enabled to access the server/web site remotely via wired or wireless connections to the network 99 (e.g., Internet). Wired or wireless communications between the server/web site and authorized users are via the public Internet in accordance with network communications protocols, e.g., TCP/IP (Transmission Control Protocol/Internet Protocol), HTTP, SMTP (Simple Mail Transfer Protocol), secure sockets layer, and/or other transport and network protocols. Additionally, a variety of communications protocols for enabling communication channels may be implemented including but not limited to: speech, VoIP, Web-Cam, or text-based communication.

As shown in FIG. 2, the system 50 preferably includes a searchable database 74 providing an inventory of rules and rule sets associated with a region (virtual society) that may be accessed and updated in the manner as described herein according to the invention. Generally, the rules are implemented in a rule-based programming language that can be integrated with platform independent software components, e.g., objects in Java, C++, and the like, as described herein with respect to FIG. 10. Additionally, control programs and/or rule-inference engines are provided that implement algorithms that interpret the rules based on a set of input data and the rules being enforced. Details regarding the contents of database 74 will be described in further detail hereinbelow. An additional user database 73 is provided that enables tracking of users and regions, i.e., virtual societies, on-line communities, etc., to which the present invention for enabling the establishment of rules created by members of the virtual society themselves, and allowing for the self-evolution of the virtual societies, is directed.

Figure 3:
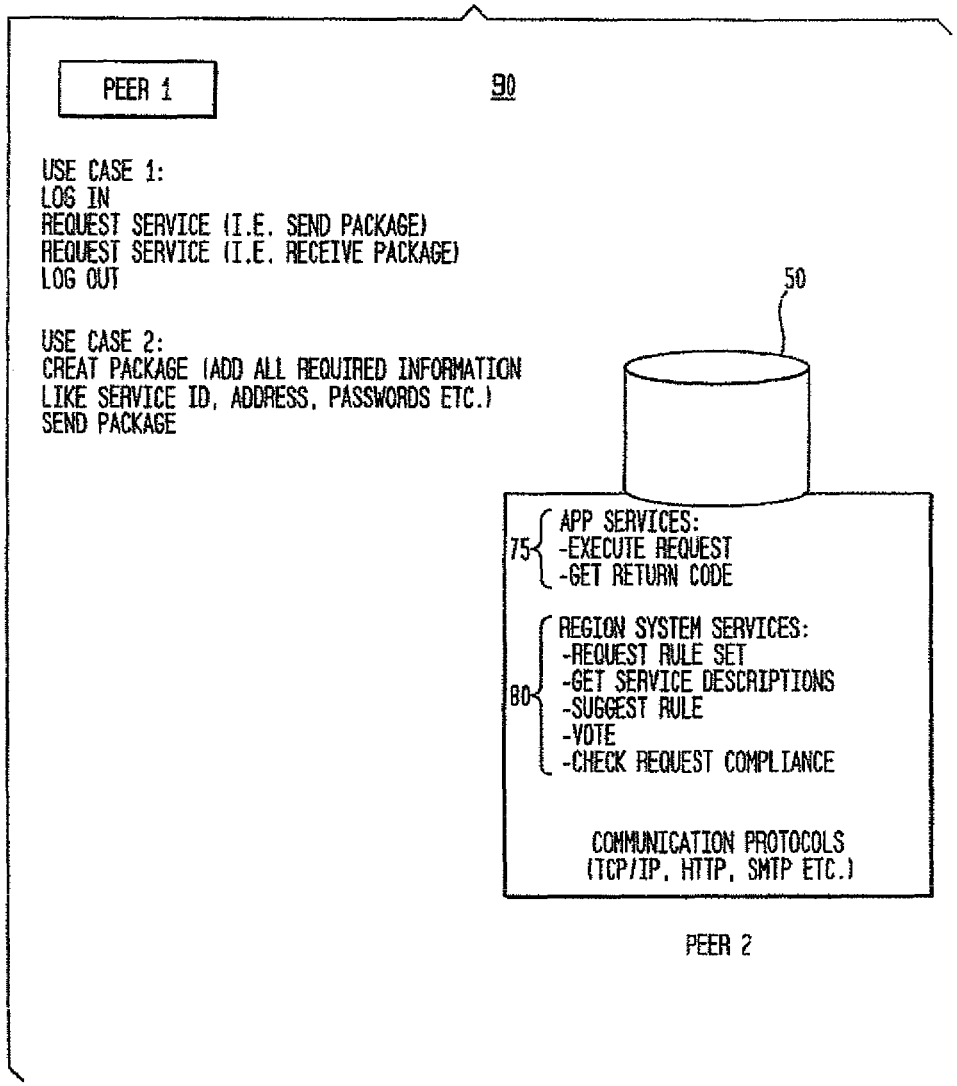
FIG. 3 is a logical view depicting an example interactive Internet-based scenario implementing the system 10 of the invention.

The software whether implemented upon one computer (e.g., in a star-based topology) or distributed across several computers in the system 50, is described by way of example with reference to a logical view 90 of the system as depicted in FIG. 3, by way of example: As shown in the example rule-based scenario, the system 50 supports Application Services 75 providing functions governing, for example, a.) Execution of the communication request such as received from a user, e.g., peer 1, use cases 1 and 2 as depicted in FIG. 3; and, b.) Obtaining return code of the request. The system 50 supports a Region System Services application 80 providing functions governing, for example, a.) Request of a rule set; b.) obtaining a service description; c.) provision of support for suggestion of the new rule; d.) provision of support for the acceptance of the new rule (for example, support for the voting for rule acceptance); and e.) verification of the rule compliance.

Figure 4:
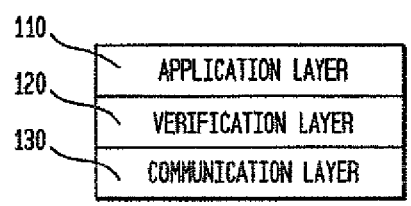
FIG. 4 depicts an example execution stack of the system implementing the system 10 of the invention.

As now shown in FIG. 4, the system 50 includes an abstraction of the (Open Systems Interconnection (OSI)) reference standard networking communications stack as implemented by software in the system 50 of the invention. As shown in FIG. 4, the execution stack 100 of the invention comprises an application layer portion 110 that provides a means for the user to access information on the network through an application (application specific processing), a Verification Layer 120 supporting rules sets processing, and a Communication Layer 130 responsible for the support of the communication. An example of the Application layer 110 includes a mail client and mail servers, HTTP client and servers, etc. An example of the Communication layer 130 is the TCP/IP layer (corresponding to the Network and Transport layers of the OSI network stack). This layer provides necessary communication between different peers and supporting servers.

Figure 5:
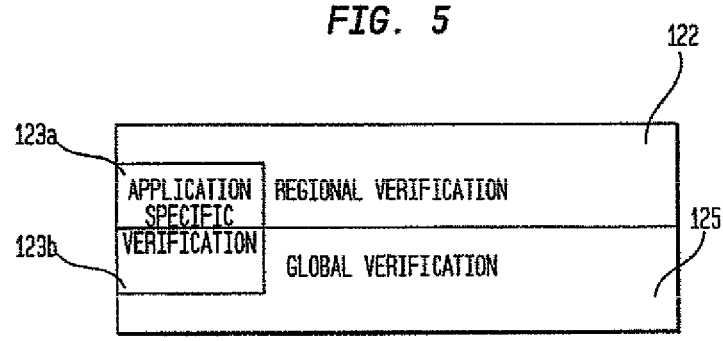
FIG. 5 depicts sub-layers of the Verification Layer of the protocol stack implementing the system 10 of the invention.

FIG. 5 describes sub-layers of the verification layer 120 of the execution stack of FIG. 4. Particularly, the Verification layer comprises two (2) sub layers—a first sub-layer 122 responsible for the support of regional rules, and another sub-layer 125 responsible for the global rules. Both sub-layers include an application dependant component—an Application Specific Verification component 123 depicted as elements 123a, b for respective sub-layers supporting regional rules 122 and global rules 125.

Figure 6:
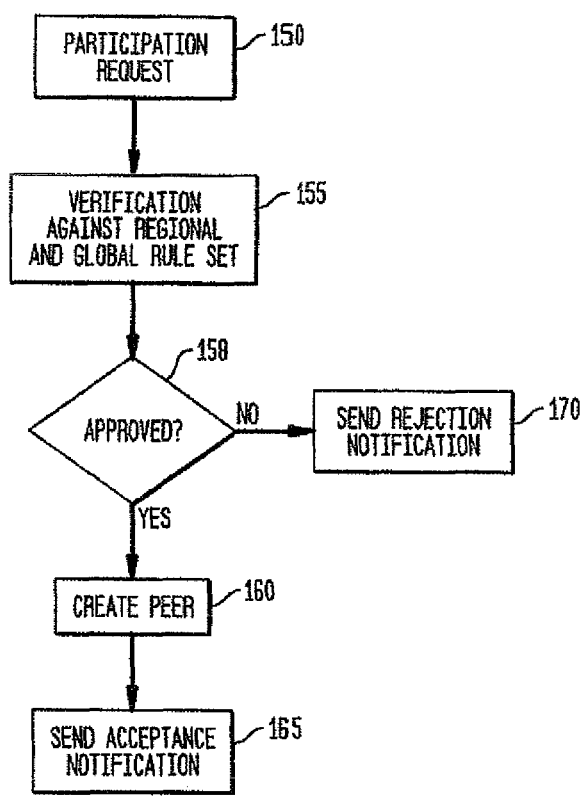
FIG. 6 depicts the methodology for creating a peer in accordance with the present invention.

FIG. 6 depicts the methodology for creating a peer in accordance with the present invention. As shown in FIG. 6, at a first step 150, a user, alternately referred to as a "peer" will generate a request via that user's computing device to participate in the region or sub-region. The request is validated against regional and global rule sets as indicated at step 155. For example, a validation may comprise a statement that system does not keep communications older than certain period of time, for example 90 days. Thus, by checking if a document creation date is earlier than 90 days from now it should be removed/replaced. More specifically, such a document maybe documents containing passwords. This step may entail the peer, from an interface generated at his/her computer device 32, accessing the searchable database 74 (FIG. 2) via a network connection using the communications protocol supported, accessing the rule sets appropriate for the region, in addition to the global rule set, and applying the rules to the user request. For example, a rule may be applied that will verify a user's request based on that user's identification (e.g., a history of the behavior of the user based on that user's ID, for instance). Then, at step 158 a determination is made as to whether the request has been validated. If the request has been validated, i.e., the request of the peer has been approved, a peer is created at step 160 and an acceptance notification is generated at step 165. The peer may be given a User ID/password combination that will be used to identify the peer in further interactions with the community. In case the request of the peer has not been approved, a rejection notification is generated as indicated at step 170.

Figure 7:
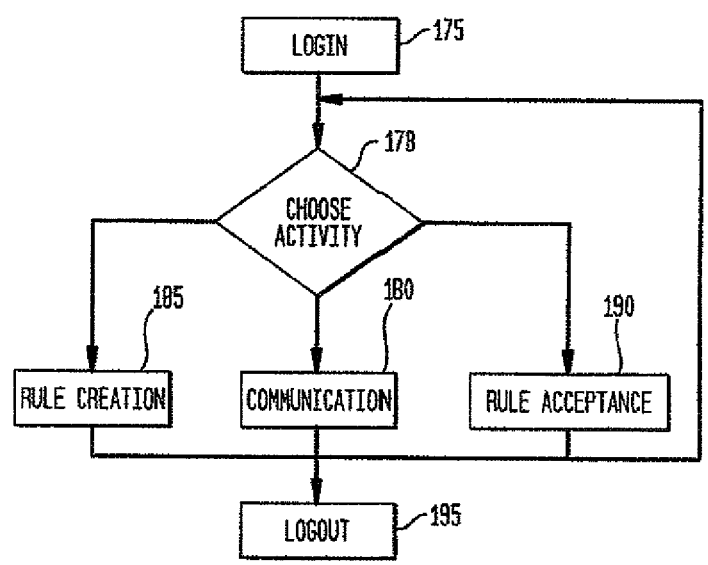
FIG. 7 depicts the main processing thread implemented by a region formed in the system 50 of the invention.

FIG. 7 depicts the main processing thread implemented by a region formed in the system 50 of the invention. As shown in FIG. 7, a system user (peer) logs in with his/her User ID via his/her computer device 32, as indicated at step 175. Via an interface generated at computer device 32, a menu choice is provided at step 178 that enables the peer to choose one from among the following activity threads: Communication activity 180, Rule Creation process 185, and Rule Acceptance process 190. Processes of the Communication and Rule Creations activities are defined in details with respect to FIGS. 8 and 9. One example of a Rule Acceptance process 190 would be enabling participation in a voting scheme enabling peers to participate in defining and determining if a rule is to be accepted as a regional rule or sub-region rule, for example. On-line voting schemas are known in the art (see for example U.S. Pat. No. 6,175,833, the entire contents and disclosure of which is incorporated by reference as if fully set forth herein), and can be implemented to enable peer voting on rules dependent upon the needs of the region/community.

Figure 8:
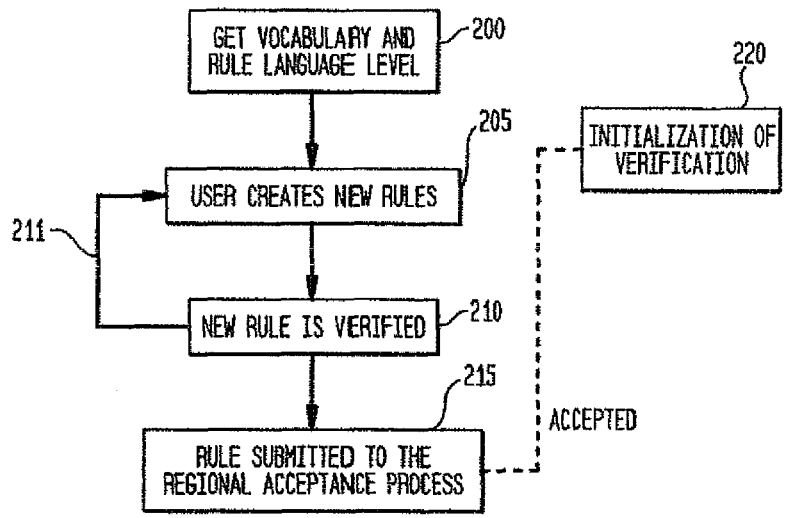
FIG. 8 depicts an example process for creating a new rule in accordance with the invention.

FIG. 8 depicts an example process for creating a new rule in accordance with the invention.

As shown in FIG. 8 at step 200, a logged in system user (peer) via his/her computer device 32, can initiate creation of a new rule. Then, dependent upon the needs of the type of community, vocabulary and rule language level information are obtained. This vocabulary and rule language level information is used to specify an Object/Action model (an "action" to be performed on an "object") and possible level of the reasoning supported by the system. For instance, a community may comprise a meeting place for children, with a specified vocabulary for interaction being the ability to only interact using voice or text-only, for example. Example of such rule is "messages/communications do not contain coarse words", and list of coarse words/expressions is kept in some accessible storage device which can be compared against. Then, continuing on to step 205, based on the Object/Action model specified, the user creates one or more new rules of appropriate reasoning level. An example rule that may be implemented comprises specifying that no-one can share art with other peers under 15 years of age, for example, or that only select few have voting rights. Any rule that is created must then be verified to establish syntactic correctness which verification step is performed at step 210, FIG. 8. If rule is incorrect it is returned to the user for correction as indicated by the line 211. Continuing, however, a rule that is determined as correct is submitted to the regional acceptance process as indicated at step 215. As will be described in greater detail hereinbelow, upon acceptance of the rule, a process of initialization of verification is started as indicated at step 220. That is, upon acceptance of the rule, any existing communications will be verified against newly accepted rule.

Figure 10:
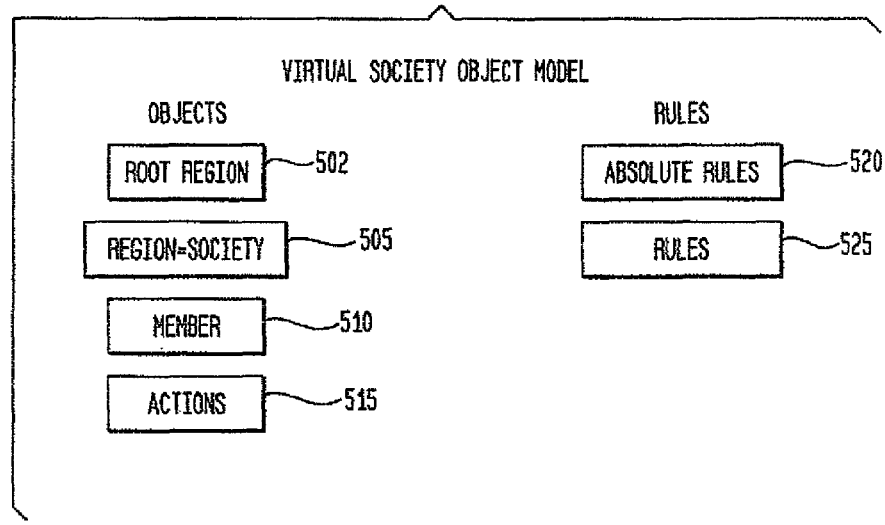
FIG. 10 depicts an object model 500 of a virtual society.

Referring now to FIG. 10, there is depicted an object model 500 of a virtual society. A member of a society performs and interacts with other members of the same region or other regions according to the regional rule system and the system of the region where the objects-subjects of interaction belong. FIG. 10 more particularly illustrates central classes of the possible object model needed to implement virtual society. The object model defines the structural relationships and dynamic interaction between a group of objects expressing virtual society. They may be realized in the language of choice (such as Java, C++, etc.). Objects of the virtual society are created and implemented to represent one or more of the following: the root region, represented as object 502; the region or society, represented as object 505; the member, represented as object 510; and action models, represented as objects 515. Corresponding objects representing rules are depicted in FIG. 10 as comprising absolute rules, represented as objects 520; and, rules, represented as objects 525. Realized objects of the virtual society are part of the implementing computer program and are created and invoked by computer program when there is a need for a structure or interaction specific to the virtual society.

Figure 11:
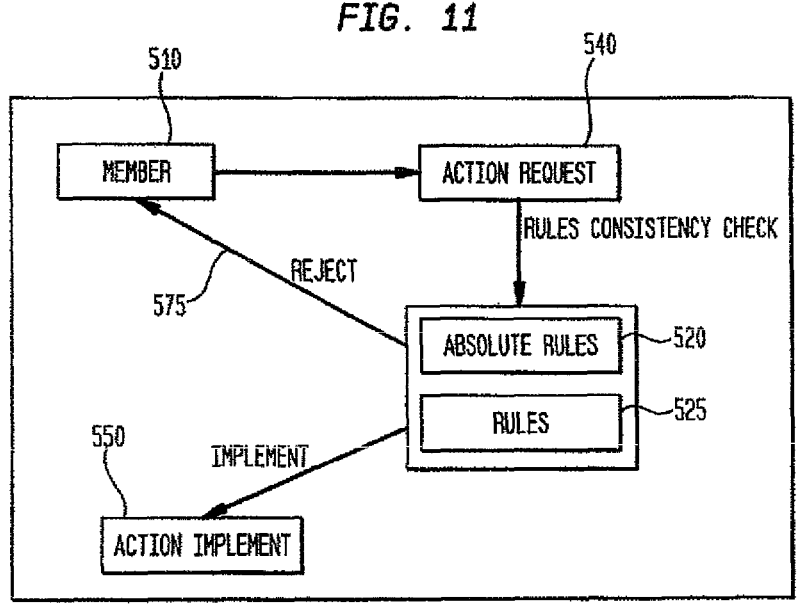
FIG. 11 depicts a sequence implemented when a member of a region or on-line community requests an action be performed.

FIG. 11 shows the block diagram of an action "meta-rule" depicting the process enabling a member (peer) to perform an action in the region (for example, sending an e-mail to a peer under the age of 15 that includes a non-text-based attachment greater than 2 Gbytes). This is performed by interaction between a member and the system 50 providing the virtual society infrastructure. As shown in FIG. 11, the following sequence is implemented when a member of the community requests an action be performed: a member 510 first initiates an action request. Then, the regional virtual society system hypervisor automatically performs a rule consistency check for checking the consistency of the request against the set of absolute rules 520 and regional rules 525 in an automated or semi-automated fashion. If the request conforms to the previous check, the request is being implemented as indicated at 550, FIG. 11. Otherwise, if the action request does not conform to the set of absolute and regional rules it is rejected as indicated at 575.

With respect to methodology depicted in FIGS. 10 and 11, rules can be categorized as comprising Absolute or "Hypervisor" rules and Regional rules. Examples of Hypervisor rules include, but are not limited to: a rule that every existing peer has the right to exist until this peer or hypervisor decides to de-construct itself; or, a rule that every user may register to the system upon agreement of hypervisor; a rule that the common resource which is being shared by peers is possible to exist according to regional/society rules enforcers. With respect to Regional rules, these are generated by members of the region/society with regional rules being enforced by regional/society rules enforcers.

Figure 9:
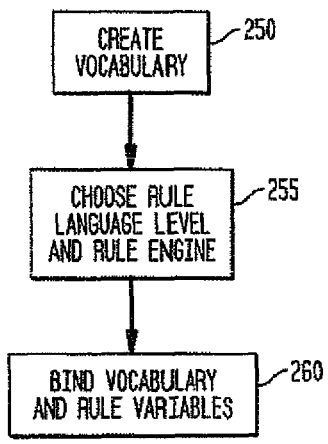
FIG. 9 depicts an initialization of verification process performed in accordance with the invention.

Referring now to FIG. 9, there is illustrated the process for initializing Verification as performed at step 220 in FIG. 8. In a first step, depicted as step 250, a Verification Service is implemented for requesting vocabulary from an application in order to create the object and action model. In the next step 255, the Verification Service requests the needed language level (examples of the language level may be forward reasoning, backward reasoning, first order logic, description logic, etc.). Then, the vocabulary of the region binds to the Object/Action Model using late binding or lazy binding schema as indicated at step 260. Note that usage of different rule inference engines may used in accordance with the patterns as described in commonly-owned, co-pending United States Patent Publication No. 2004/0083454 A1, entitled Object Oriented Framework for Reasoning Having Pluggable Inference Engines, the whole disclosure and contents of which are incorporated by reference as if fully set forth herein.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

The invention claimed is:

1. A method for managing a virtual society comprising an on-line community of peers interacting via computer systems through the Internet, said method comprising:
    providing, by members of said on-line community, a rule system comprising rules for governing actions that may be performed by members of said on-line community;
    receiving, at the initiation of a member of the virtual society, via a respective computer system, an action request, said action request comprising an interaction with another member of said virtual society via a communication channel supporting on-line communications according to a predetermined communications protocol, said protocol comprising a protocol stack including a verification layer supporting rules set processing; and,
    enforcing, via said verification layer, rules that determine compliance of said action request with one or more said rules that govern whether the action of said action request is to be performed; and
    one of, rejecting said action request if not in compliance with said rule or enabling performance of said action request if in compliance with said rules,
    said virtual society includes a global region of interacting computer systems, and said global region partitioned as a plurality of regions, each region being hierarchically organized as comprising none or more sub-regions, said regions and sub-regions defining domains on which corresponding rules systems apply, said rules set processing including regional and global rules processing
    wherein said on-line community of peers is self-evolving by enabling members to change rules for said on-line community's own evolution,
    wherein a processor unit implementing a program executes one or more of said receiving, enforcing, and rejecting or enabling.

2. The method as claimed in claim 1, wherein a social behavior of members of said virtual society is supported in accordance with needs of said virtual society.

3. The method as claimed in claim 1, wherein said rules are embodied as software components.

4. The method as claimed in claim 1, wherein members of an on-line community performs and interacts with other members in a same or other regions according to a regional rule-system.

5. The method as claimed in claim 1, wherein said enforcing of rules that determine compliance of an action request with one or more said rules that govern whether an action of said action request is to be performed comprises determining if said action request conforms to a set of regional rules, said regional rules being generated by members of the region or society.

6. The method as claimed in claim 5, wherein said providing, by members of said on-line community, a rule system, further comprises:
    enabling members of a region to create a proposed rule for acceptance within a region; and,
    enabling members of said region to accept a created rule by a voting scheme.

7. The method as claimed in claim 6, wherein said creating of a proposed rule by a member comprises:

implementing a vocabulary and a rule language to specify an object/action model and a level of reasoning supported by the system;

creating one or more rules based on the supported reasoning level; and, verifying a rule to establish syntactic correctness.

8. The method as claimed in claim 7, wherein said creating of a proposed rule by a member further comprises:

submitting a verified rule to a regional acceptance process, said acceptance process comprising:

requesting vocabulary from an application in order to create an object and action model;

requesting a language level; and, binding said vocabulary to the Object/Action model.

9. The method as claimed in claim 8, wherein a language level comprises one or more of: forward reasoning, backward reasoning, first order logic, description logic.

10. The method as claimed in claim 6, wherein said self-evolving on-line community of peers is a projection of a human society governed in accordance with democratic principles, said democratic principles taking into account interests of a selected group, wherein said global region of interacting computer systems is partitionable into regions and sub-regions formed to accept rules of members that form the selected group.

11. The method as claimed in claim 10, wherein said voting scheme results in non-acceptance of a rule by a majority vote, a selected group of members of said self-evolving on-line community forming a new said region or sub-region having said non-accepted rule as an accepted rule for said selected group.

12. The method as claimed in claim 11, wherein the selected group includes one of: a majority amount of members or a minority amount of members of said virtual society.

13. The method as claimed in claim 1, wherein said enforcing of rules that determine compliance of a requested action with one or more said rules that govern whether said requested action is to be performed comprises: determining, by a hypervisor, if a request conforms to a set of absolute rules.

14. The method as claimed in claim 13, wherein an absolute rule comprises one or more of: a rule that every peer has the right to exist until the peer or hypervisor de-constructs itself, a rule that every user may register to the system upon agreement of the hypervisor, or, a rule that a common resource which is being shared by peers is possible to exist according to regional/society rules enforcers.

15. A program storage device readable by a machine, tangibly embodying a program of instructions executable by the machine to perform managing a virtual society comprising an on-line community of peers interacting via computer systems through the Internet according to claim 1.

16. The program storage device readable by a machine according to claim 15, wherein said self-evolving on-line community of peers is a projection of a human society governed in accordance with democratic principles, said democratic principles taking into account interests of a selected group, wherein said global region of interacting computer systems is partitionable into regions and sub-regions formed to accept created rules of members that form the selected group.

17. The program storage device readable by a machine according to claim 16, wherein the selected group includes one of: a majority amount of members or a minority amount of members of said virtual society.

18. The method as claimed in claim 1, wherein said verification sub-layer comprises a first sub-layer responsible for the supporting implementation of said regional rules, and second sub-layer responsible for supporting implementation of global rules, and, an application dependant component for respective sub-layers supporting said regional rules and global rules.

19. The method as claimed in claim 1, wherein said self-evolving on-line community of peers is a projection of a human society governed in accordance with democratic principles, said democratic principles taking into account interests of a selected group, wherein said global region of interacting computer systems is partitionable into regions and sub-regions formed to accept created rules of members that form the selected group.

20. The method as claimed in claim 19, wherein said self-evolving on-line community of peers is a projection of a human society governed in accordance with democratic principles as opposed to the rules regulating a totalitarian regime.

21. The method as claimed in claim 19, wherein the selected group includes one of: a majority amount of members or a minority amount of members of said virtual society.

22. A self-evolving system for managing a virtual society comprising an on-line community of peers interacting via computer systems through the Internet, said system comprising:

a memory;

a processor in communication with said memory, wherein the processor performs a method comprising:

generating a rule system comprising rules for governing actions that may be performed by members of said on-line community;

initiating, by said members of a society, an action request comprising an interaction with another member of said virtual society via a communication channel supporting on-line communications according to a predetermined communications protocol, said protocol comprising a protocol stack including a verification sub-layer supporting rules set processing; and, enforcing, via said verification layer, rules that determine compliance of said action request with one or more said rules that govern whether an action of said action request is to be performed, wherein said action is rejected if not in compliance with said rule or, said action is performed if in compliance with said rules, wherein said virtual society includes a global region of interacting computer systems, said global region is partitioned as a plurality of regions, each region being hierarchically organized as comprising none or more sub-regions, said regions and sub-regions defining domains on which corresponding rules systems apply, said rules set processing including regional and global rules processing, wherein social behavior of members of said virtual society is supported in accordance with needs of said virtual society.

23. The self-evolving system as claimed in claim 22, wherein said generating a rule system comprises:

creating, by a member via a processor device, a proposed rule for acceptance within a region; and, enable members of said region to accept a created rule by a voting scheme, said on-line community of peers being self-evolving as members change rules for said on-line community's own evolution.

24. The self-evolving system as claimed in claim 23, wherein said enabling members to create a proposed rule comprises:

implementing, via said processor, a vocabulary and a rule language to specify an object/action model and a level of reasoning supported by the system and, for creating one or more rules based on the supported reasoning level; and, verifying, via said processor, a rule to establish syntactic correctness.

25. The self-evolving system as claimed in claim 24, wherein said creating of a proposed rule by a member further comprises:

submitting, via said processor, a verified rule to a regional acceptance process, said acceptance process performing steps of:

requesting vocabulary from an application in order to create an object and action model;

requesting a language level; and, binding said vocabulary to the Object/Action model.

26. The self-evolving system as claimed in claim 23, wherein said virtual society including said global region of interacting computer systems is a projection of a human society governed in accordance with democratic principles that take into account interests of a selected group, wherein said global region of interacting computer systems is partitionable into regions and sub-regions formed to accept rules of members that form the selected group.

27. The self-evolving system as claimed in claim 26, wherein said voting scheme results in non-acceptance of a rule by a majority vote, a selected group of members of said self-evolving on-line community forming a new said region or sub-region having said non-accepted rule as an accepted rule for said selected group.

28. The self-evolving system as claimed in claim 27, wherein the selected grouped includes one of: a majority amount of members or a minority amount of members of said virtual society.

29. The self-evolving system as claimed in claim 22, wherein members of an on-line community performs and interacts with other members in a same or other regions according to a regional rule-system, said enforcing rules that determine compliance of a requested action with one or more said rules that govern whether said requested action is to be performed comprising:

determining if a request conforms to a set of regional rules, said regional rules being generated by members of the region or society.

30. The self-evolving system as claimed in claim 22, wherein said enforcing rules that determine compliance of a requested action with one or more said rules that govern whether said requested action is to be performed comprises: a-determining, by a hypervisor, if a request conforms to a set of absolute rules.

31. The self-evolving system as claimed in claim 30, wherein an absolute rule comprises one or more of: a rule that every peer has the right to exist until the peer or hypervisor de-constructs itself, a rule that every user may register to the system upon agreement of the hypervisor, or, a rule that a common resource which is being shared by peers is possible to exist according to regional/society rules enforcers.

32. The self-evolving system as claimed in claim 22, wherein said verification sub-layer comprises a first sub-layer responsible for the supporting implementation of said regional rules, and second sub-layer responsible for supporting implementation of global rules, and, an application dependant component for respective sub-layers supporting said regional rules and global rules.

33. The self-evolving system as claimed in claim 22, wherein said virtual society including said global region of interacting computer systems is a projection of a human society governed in accordance with democratic principles that take into account interests of a selected group, wherein said global region of interacting computer systems is partitionable into regions and sub-regions formed to accept created rules of members that form the selected group.

34. The self-evolving system as claimed in claim 33, wherein the selected group includes one of: a majority amount of members or a minority amount of members of said virtual society.

* * * * *